W. S. O'BRIEN.
Harrows.
No. 155,543. Patented Sept. 29, 1874.
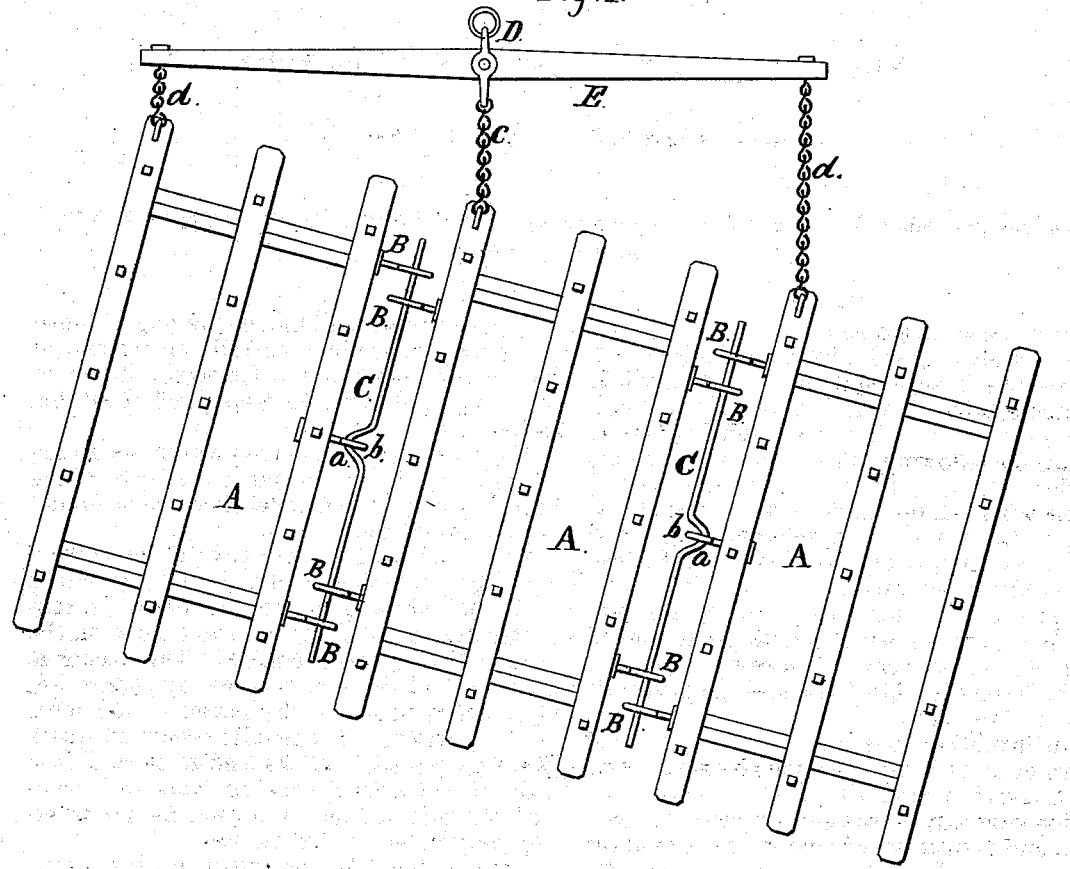
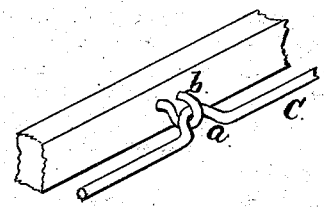

UNITED STATES PATENT OFFICE.

WILLIAM S. O'BRIEN, OF KEWANEE, ILLINOIS.

IMPROVEMENT IN HARROWS.

Specification forming part of Letters Patent No. 155,543, dated September 29, 1874; application filed February 23, 1874.

*To all whom it may concern:*

Be it known that I, WILLIAM S. O'BRIEN, of Kewanee, in the county of Henry and State of Illinois, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

Figure 1 is a plan view. Fig. 2 is a perspective view, showing coupling-rod hinged or pivoted to the beam of harrow.

Like letters in both figures of the drawings indicate like parts.

This invention consists in the combination of two or more harrow-sections by means of a coupling-rod having a hinged or pivotal connection centrally on the side of one of the sections, and eyes attached thereto, so as to allow the sections of the harrow to be easily detached.

A A A are the harrows, constructed and provided with teeth in the usual manner. Metallic eyes B B are attached to the side of each harrow near the ends. C is the coupling-rod, having a crook or bend, a, in the center, and, when passed through the eyes to couple the harrows together, the crook or bend a is connected with a hook, b, attached centrally to the side of the harrow, the hook being placed far enough in the beam of the harrow to allow the rod to have a slight spring-bearing therein, so as to prevent it from coming out.

Thus, it will be seen, the rod, having a hinged or pivotal connection centrally on the side of the harrow, permits the latter to vibrate or play back and forth for a space of about ten inches.

The sections of the harrow can be separated or united by lifting the bend a to or from the hook b, and in this manner increase or diminish the size of the harrow.

D is a clevis, having a pivotal connection with the center of evener E, and extending back and forming a hook, to which is connected the chain c, attached to a hook on the beam of the middle harrow. The evener is inclined, and the end secured by chains d d, attached to hooks on the beams of the outer or side harrows. The middle harrow is drawn direct by the chain c, attached to clevis D, the ends of the evener working back and forth with the side harrows, and each harrow working independently of the other.

Having thus fully described my invention, what I claim therein as new, and desire to secure by Letters Patent, is—

The combination of the coupling-rod C, having the bend a, with the harrow-sections A A and eyes B B by means of the hook b, substantially as shown and set forth.

In testimony that I claim the foregoing I have hereunto set my hand this 27th day of January, 1874.

WILLIAM S. O'BRIEN.

Witnesses:
MORTIMER O'SULLIVAN,
FRANCIS CAHOW.